(12) United States Patent
Wu (10) Patent No.: US 10,069,265 B2
(45) Date of Patent: Sep. 4, 2018

(54) INTERFACE CONVERSION ADAPTER AND ELECTRICAL CONNECTION DEVICE WITH THE INTERFACE CONVERSION ADAPTER

(71) Applicant: SHENZHEN HEVOLABS TECHNOLOGY COMPANY LTD., Shenzhen (CN)

(72) Inventor: Tingqiang Wu, Shenzhen (CN)

(73) Assignee: SHENZHEN HEVOLABS TECHNOLOGY COMPANY LTD., Shenzhen, Guangdong (CN)

( * ) Notice: Subject to any disclaimer, the term of this patent is extended or adjusted under 35 U.S.C. 154(b) by 20 days.

(21) Appl. No.: 15/325,175

(22) PCT Filed: Jul. 10, 2015

(86) PCT No.: PCT/CN2015/083711
§ 371 (c)(1),
(2) Date: Jan. 10, 2017

(87) PCT Pub. No.: WO2016/004888
PCT Pub. Date: Jan. 14, 2016

(65) Prior Publication Data
US 2017/0162990 A1    Jun. 8, 2017

(30) Foreign Application Priority Data

Jul. 10, 2014  (CN) .................... 2014 2 0379785 U
Feb. 6, 2015   (CN) .......................... 2015 1 0067903

(51) Int. Cl.
H01R 13/62    (2006.01)
H01R 27/02    (2006.01)
(Continued)

(52) U.S. Cl.
CPC ......... H01R 31/06 (2013.01); H01R 13/6205 (2013.01); H01R 27/02 (2013.01);
(Continued)

(58) Field of Classification Search
CPC .... H01R 31/06; H01R 13/6205; H01R 27/02; H01R 13/2421
(Continued)

(56) References Cited

U.S. PATENT DOCUMENTS 6,758,697 B1 *  7/2004  Wu ................. H01R 31/06
                                              439/638
8,986,032 B2 *  3/2015  Liao ............... H01R 13/44
                                              439/304
(Continued)

FOREIGN PATENT DOCUMENTS

CN    102610975 A    7/2012
CN    202513416 U    10/2012
(Continued)

OTHER PUBLICATIONS

International Search Report for PCT/CN2015/083111 (dated Aug. 28, 2015).

*Primary Examiner* — Renee Luebke
*Assistant Examiner* — Paul Baillargeon
(74) *Attorney, Agent, or Firm* — McClure, Qualey & Rodack, LLP (57) ABSTRACT

An interface conversion adapter, configured to be inserted into a plug-in interface of an electronic apparatus to convert a plug-in electrical connection manner of the plug-in interface into a surface contact electrical connection manner, where the interface conversion adapter includes a contact end and a plug-connected end electrically connected to the contact end; the plug-connected end is electrically inserted into the plug-in interface of the electronic apparatus; the contact end is exposed out of the plug-in interface; and several conductive contacts are provided on a surface, exposed out of the plug-in interface, of the contact end. A plug-in connector interface of the electronic apparatus can be converted into surface contact conductive contacts by (Continued)

using the interface conversion adapter. The present invention further relates to an electrical connection device with the interface conversion adapter.

14 Claims, 9 Drawing Sheets

(51) Int. Cl.
*H01R 24/60* (2011.01)
*H01R 31/06* (2006.01)
*H02J 7/00* (2006.01)
*H01R 13/24* (2006.01)
*H01R 107/00* (2006.01)

(52) U.S. Cl.
CPC ............ *H02J 7/00* (2013.01); *H01R 13/2421* (2013.01); *H01R 24/60* (2013.01); *H01R 2107/00* (2013.01)

(58) Field of Classification Search
USPC ................... 439/651, 653, 628, 38, 39, 638
See application file for complete search history.

(56) References Cited

U.S. PATENT DOCUMENTS

| | | | |
|---|---|---|---|
| 9,209,547 B2* | 12/2015 | Lozano Villarreal | ........................ H01R 13/2421 |
| 9,362,664 B2* | 6/2016 | Yen | ..................... H01R 13/6205 |
| 2013/0040470 A1* | 2/2013 | Gao | ................... H01R 13/5808 439/39 |
| 2016/0211609 A1* | 7/2016 | Sorias | ................ H01R 13/6205 |

FOREIGN PATENT DOCUMENTS

| | | |
|---|---|---|
| CN | 202663135 U | 1/2013 |
| CN | 103840495 A | 6/2014 |
| CN | 104124719 A | 10/2014 |
| CN | 104716540 A | 6/2015 |
| CN | 204424648 U | 6/2015 |
| JP | 2012044783 A | 3/2012 |

* cited by examiner

INTERFACE CONVERSION ADAPTER AND ELECTRICAL CONNECTION DEVICE WITH THE INTERFACE CONVERSION ADAPTER

BACKGROUND

Technical Field

The present invention relates to a connector, and in particular, to an interface conversion adapter and an electrical connection device with the interface conversion adapter.

Related Art

Plug-in interfaces are used in all existing electronic apparatuses (for example, a mobile phone, or a tablet computer) to perform data connection and charging functions, for example, data lines. However, in a process of performing charging by using a data line, a connector needs to be constantly inserted and extracted, which is troublesome. In addition, people need to carry a data line when going out to charge an electronic apparatus in real time. However, some electronic apparatuses also use an inductive wireless charging technology. However, this technology has low charging efficiency, adds a thickness of a device, and occupies an inner space of the electronic apparatus.

SUMMARY

In view of the above, it is necessary to provide an interface conversion adapter that is connected conveniently and can implement data transmission and charging on an electronic apparatus, and an electrical connection device.

An interface conversion adapter, configured to be inserted into a plug-in interface of an electronic apparatus to convert a plug-in electrical connection manner of the plug-in interface into a surface contact electrical connection manner, where the interface conversion adapter includes a contact end and a plug-connected end electrically connected to the contact end; the plug-connected end is electrically inserted into the plug-in interface of the electronic apparatus; the contact end is exposed out of the plug-in interface; and several conductive contacts are provided on a surface, exposed out of the plug-in interface, of the contact end.

An electrical connection device, configured to be electrically connected to an electronic apparatus to implement charging and/or data transmission on the electronic apparatus, where the electrical connection device includes a connector pair and a base electrically connected to one connector of the connector pair; the connector pair includes an interface conversion adapter and a contactor electrically connected to the interface conversion adapter; the interface conversion adapter is the foregoing interface conversion adapter; the contactor includes a magnetic metal housing and multiple spring needles; the multiple spring needles are inserted in the magnetic metal housing and are elastically provided on the base to be electrically connected to multiple conductive contacts in the interface conversion adapter; magnetic pieces configured to fix the base and the electronic apparatus are provided on the contactor or the interface conversion adapter.

In the present invention, a plug-in connector interface of the electronic apparatus can be converted into surface contact conductive contacts by using the interface conversion adapter. In this way, when charging and/or data transmission are performed on the electronic apparatus by means of the base (including one or a combination of multiple of the aforementioned charging cradle, mobile power supply, or cable connector), a magnetic attraction connection may be used. A charging process of the electronic apparatus is simplified into only one step to implement a contact wireless charging manner without repeated insertion and extraction, having strong practicability, and being easy and convenient.

BRIEF DESCRIPTION OF THE DRAWINGS

The present invention will become more fully understood from the detailed description given herein below for illustration only, and thus are not limitative of the present invention, and wherein.

To describe technical solutions of embodiments of the present invention or the prior art more clearly, the accompanying drawings that need to be used to describe the embodiments or the prior art are briefly introduced below. Obviously, the following described accompanying drawings are merely some embodiments of the present invention. A person skilled in the art can also obtain the accompanying drawings of other embodiments according to the following described accompanying drawings without inventive efforts.

DETAILED DESCRIPTION

To facilitate understanding the present invention, the present invention is described more comprehensively below with reference to relevant accompanying drawings. The accompanying drawings provide preferred embodiments of the present invention. However, the present invention can be implemented in a lot of different forms, and is not limited to the embodiments described in the present text. On the contrary, an objective of providing the embodiments is to understand content disclosed in the present invention more thoroughly and comprehensively.

It should be noted that, when an element is called to be "fixed" to another element, the element may be directly on the another element, or a centered element may also exist. When an element is considered to be "connected" to another element, the element may be directly connected to the another element, or a centered element may exist at the same time.

Unless otherwise defined, all science and technology terms used in the present text have the same meanings as those generally understood by a person skilled in the technical field of the present invention. Terms used in the description of the present invention in the present text are only for the objective of describing specific embodiments, and are not intended to limit the present invention. Term "and/or" used in the present text includes any one of, a random combination of, and all of the relevant listed items.

Figure 1:
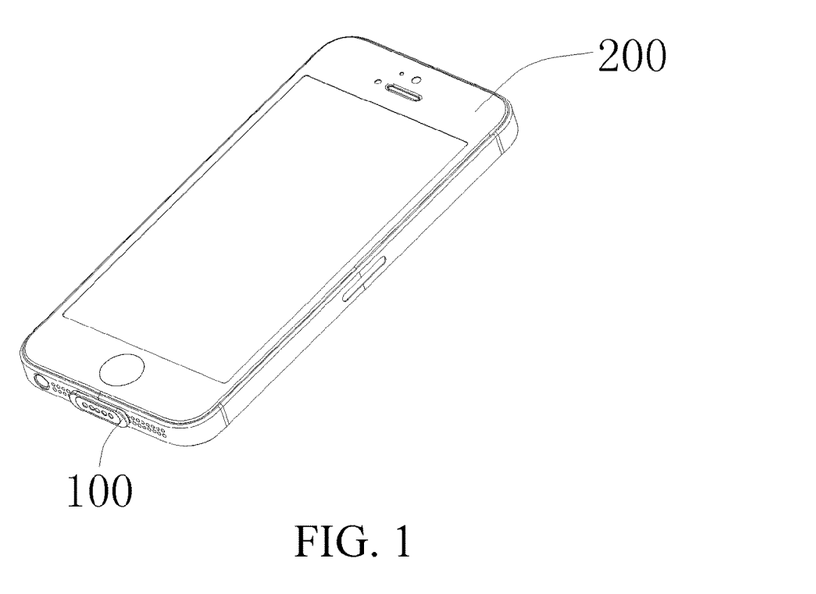
FIG. 1 is a diagram of state in which an interface conversion adapter matches an electronic apparatus of an embodiment.

Referring to FIG. 1, an interface conversion adapter 100 in an embodiment is electrically plug-connected in a plug-in interface (not shown) of an electronic apparatus 200 to convert a plug-in electrical connection manner of the plug-in interface into a surface contact electrical connection manner. The plug-in interface is a Micro-USB interface, a USB 3.1 Type-C, a lightning interface of an iPhone or iPad, or the like provided on the electronic apparatus 200. The electronic apparatus 200 may be an electronic apparatus with a plug-in interface, for example, a mobile phone, a tablet computer, and the like.

Detailed description is made below by separately using that the interface conversion adapter 100 matches the Micro-USB interface and that the interface conversion adapter 100 matches the lightning interface as examples.

Figure 2:
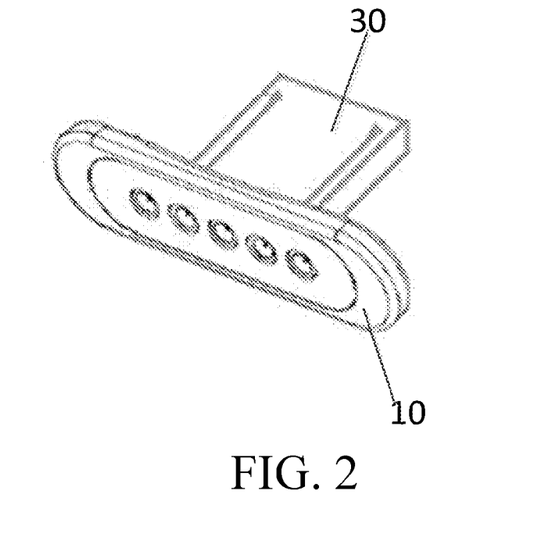
FIG. 2 is a schematic structural diagram of an interface conversion adapter in a first embodiment.
Figure 3:
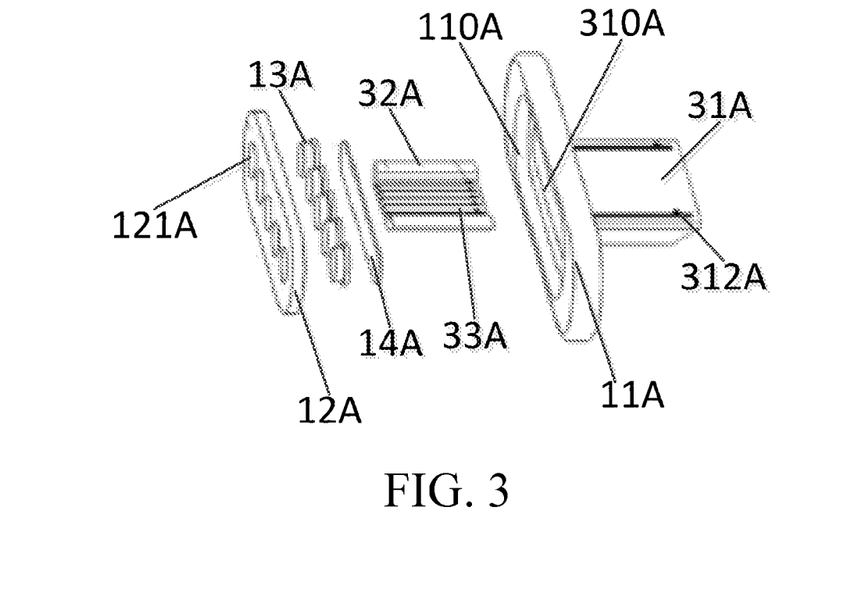
FIG. 3 is an exploded view of the interface conversion adapter shown in FIG. 2.

Referring to FIG. 2 and FIG. 3, the interface conversion adapter 100 is approximately T-shaped and includes a contact end 10 and a plug-connected end 30 electrically connected to the contact end 10. In use, the plug-connected end 30 is inserted into a connector interface of the electronic apparatus 200; the contact end 10 is exposed out of the connector interface to be electrically connected to an external device (not shown).

In a first embodiment, the contact end 10 includes a first frame body 11A, a first insulation piece 12A, multiple conductive contacts 13A, and a circuit board 14A. The plug-connected end 30 includes a second frame body 31A, a second insulation piece 32A, and multiple conductive pins 33A.

When the interface conversion adapter 100 is inserted into the connector interface of the electronic apparatus 200, the first frame body 11A is exposed out of the connector interface of the electronic apparatus 200 and is attracted to the external device, so as to fix the electronic apparatus 200 to the external device; the second frame body 31A is plug-connected in the connector interface of the electronic apparatus 200 and is connected to a ground end in the electronic apparatus 200. In this embodiment, the first frame body 11A and the second frame body 31A are ferromagnetic metal conductive frames that are integrally formed and T-shaped, so that attraction to the external device and connection to the ground end in the connector interface of the electronic apparatus 200 are implemented at the same time after the interface conversion adapter 100 is inserted into the electronic apparatus 200. The first frame body 11A is a lateral extended edge, and the second frame body 31A is a vertical extended edge perpendicular to the first frame body 11A. In addition, after the interface conversion adapter 100 is inserted into the connector interface of the electronic apparatus 200, a part exposed out of the connector interface is thin, so that the first metal frame body 11A can effectively ensure strength of the interface conversion adapter 100.

It can be understood that in some other embodiments, the first frame body 11A and the second frame body 31A can be independently set, and they are fixedly connected in other manners (for example, welding or screws). In addition, shapes of the first frame body 11A and the second frame body 31A can also be determined according to a shape of the connector interface in the electronic apparatus 200, and materials can also be determined according to requirements, and limitation is not made herein.

A first accommodating space 110A that passes through a surface is provided in the middle of the first frame body 11A. In addition, one side of the first frame body 11A is recessed inwards to form a particular arc, so that the interface conversion adapter 100 can be extracted by a user with applied force after being assembled on the connector interface of the electronic apparatus 200. In this embodiment, the first insulation piece 12A is a plastic plate provided on the first frame body 11A, and is configured to mount the conductive contacts 13A and insulate the conductive contacts 13A from the first frame body 11A. Specifically, the first insulation piece 12A is accommodated in the first accommodating space 110A, and multiple through holes 121A are provided on a surface of the first insulation piece 12A along an extension direction of the first frame body 11A. In some other embodiments, the first insulation piece 12A and the first frame body 11A can be set as an entirety, and limitation is not made herein.

The multiple conductive contacts 13A are electrically connected to one side of the circuit board 14A, and are accommodated in the first accommodating space 110A of the first frame body 11A along with the circuit board 14A. The multiple conductive contacts 13A pass through the multiple through holes 121A in a one-to-one correspondence manner, are exposed out of the first insulation piece 12A, and get in conductive contact with the external device attracted on the interface conversion adapter 100, so as to implement electrical connection between the interface conversion adapter 100 and the external device, thereby implementing electrical connection between the electronic apparatus 200 and the external device. In this embodiment, the conductive contacts 13A are five metal conductive contacts.

The second frame body 31A is approximately hollow-shaped, and a second accommodating space 310A in communication with the first accommodating space 110A is provided in the second frame body 31A. A buckle 312A is provided on a surface of the second frame body 31A; the interface conversion adapter 100 is engaged with the connector interface in the electronic apparatus 200 by means of the buckle 312A to prevent the interface conversion adapter 100 from falling off.

One-ends of the multiple conductive pins 33A are spaced on a surface of the second insulation piece 32A, and are accommodated in the second accommodating space 310A of the second frame body 31A along with the second insulation piece 32A. The-other-ends of the multiple conductive pins 33A are electrically connected to one surface, back to the conductive contacts 13, of the circuit board 14A to implement electrical connection to the conductive contacts 13A. In this embodiment, the-other-ends of the conductive pins 33A are welded on the circuit board 14A, so that when a plug-connected end 30A is inserted into the connector interface of the electronic apparatus 200, the interface conversion adapter 100 is electrically connected to the connector interface of the electronic apparatus 200. The second insulation piece 32A is configured to insulate the multiple conductive pins 33A, and is configured to insulate the multiple conductive pins 33A from the second frame body 31A.

In this specific embodiment, the used solution is implemented in a manner of a Micro-USB interface conversion adapter. The first frame body 11A and the second frame body 31A of the Micro-USB interface conversion adapter are processed and manufactured by using integrally formed iron-containing steel. The first insulation piece 12A is a porous plastic sheet; the multiple conductive contacts 13A are metal conductive contacts; the circuit board 14A is a flexible circuit board; and the second insulation piece 32A is a plastic filler. The Micro-USB interface conversion adapter converts a Micro-USB interface of a side bezel of an existing mobile device into magnetic attraction connection contacts attached to a surface of the side bezel. An external connector implements connection to the Micro-USB interface of the mobile device by means of magnetic attraction to the Micro-USB interface conversion adapter. The first frame body 11A and the second frame body 31A of the Micro-USB interface conversion adapter are processed and manufactured by using iron-containing steel, and can be attracted by a magnet. The Micro-USB interface conversion adapter is attached to the side bezel of the mobile device after being inserted into the Micro-USB interface.

Figure 4:
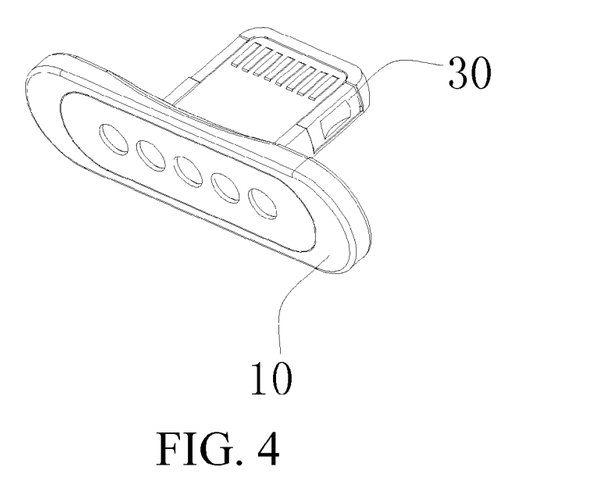
FIG. 4 is a schematic structural diagram of an interface conversion adapter in a second embodiment.
Figure 5:
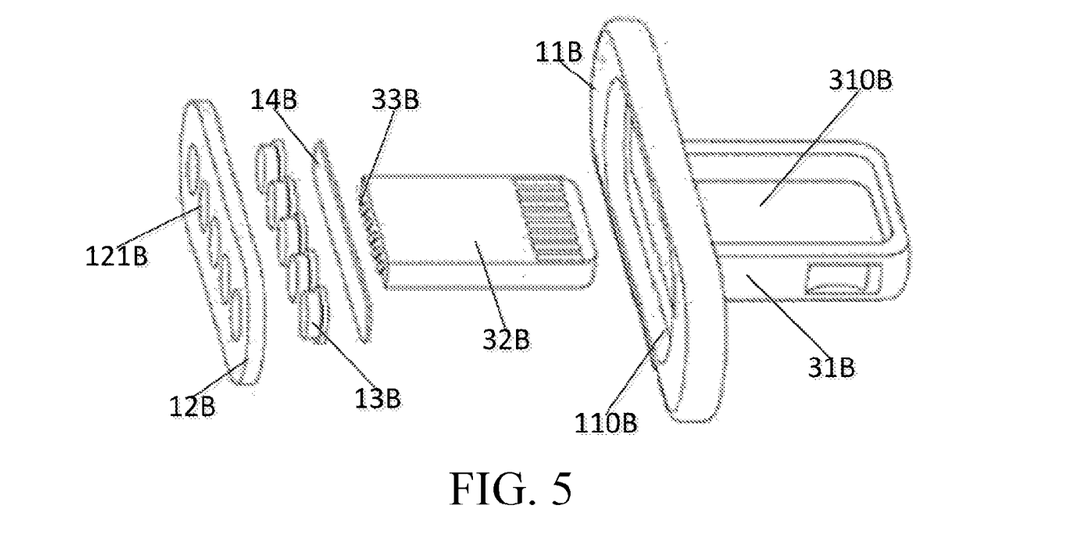
FIG. 5 is an exploded view of the interface conversion adapter shown in FIG. 4.

Referring to FIG. 4 and FIG. 5, in a second embodiment, the interface conversion adapter 100 is configured to be plug-connected in a lightning interface of an electronic apparatus, for example, an iPhone or an iPad.

The contact end 10 includes a first frame body 11B, a first insulation piece 12B, multiple conductive contacts 13B, and a circuit board 14B. The plug-connected end 30 includes a second frame body 31B, a second insulation piece 32B, and multiple conductive pins 33B.

When the interface conversion adapter 100 is inserted into the lightning interface of the electronic apparatus 200, the first frame body 11B is exposed out of the lightning interface of the electronic apparatus 200 and is attracted to the external device, so as to fix the electronic apparatus 200 to the external device; the second frame body 31B is plug-connected in the lightning interface of the electronic apparatus 200 and is connected to a ground end in the electronic apparatus 200. In this embodiment, the first frame body 11B and the second frame body 31B are ferromagnetic metal conductive frames that are integrally formed and T-shaped, so that attraction to the external device and connection to the ground end in the connector interface of the electronic apparatus 200 are implemented at the same time after the interface conversion adapter 100 is inserted into the electronic apparatus 200. The first frame body 11B is a lateral extended edge, and the second frame body 31B is a vertical extended edge perpendicular to the first frame body 11B. In addition, after the interface conversion adapter 100 is inserted into the lightning interface of the electronic apparatus 200, a part exposed out of the lightning interface is thin, so that the first frame body 11B that includes a metal material can effectively ensure strength of the interface conversion adapter 100.

It can be understood that in some other embodiments, the first frame body 11B and the second frame body 31B can be independently set, and they are fixedly connected in other manners (for example, welding or screws). In addition, shapes of the first frame body 11B and the second frame body 31B can also be determined according to a shape of the lightning interface in the electronic apparatus 200, and materials can also be determined according to requirements, and limitation is not made herein.

A first accommodating space 110B that passes through a surface is provided in the middle of the first frame body 11B. In addition, one side of the first frame body 11B is recessed inwards to form a particular arc, so that the interface conversion adapter 100 can be extracted by a user with applied force after being assembled on the lightning interface of the electronic apparatus 200. In this embodiment, the first insulation piece 12B is a plastic plate provided in the first frame body 11B, and is configured to mount the conductive contacts 13B and insulate the conductive contacts 13B from the first frame body 11B. Specifically, the first insulation piece 12B is accommodated in the first accommodating space 110B, and multiple through holes 121B are provided on a surface of the first insulation piece 12B along an extension direction of the first frame body 11B. In some other embodiments, the first insulation piece 12B and the first frame body 11B can be set as an entirety, and limitation is not made herein.

The multiple conductive contacts 13B are electrically connected to one side of the circuit board 14B, and are accommodated in the first accommodating space 110B of the first frame body 11B along with the circuit board 14B. The multiple conductive contacts 13B pass through the multiple through holes 121B in a one-to-one correspondence manner, are exposed out of the first insulation piece 12B, and get in conductive contact with the external device attracted on the interface conversion adapter 100, so as to implement electrical connection between the interface conversion adapter 100 and the external device, thereby implementing electrical connection between the electronic apparatus 200 and the external device. In this embodiment, the conductive contacts 13B are five metal conductive contacts.

A second accommodating space 310B in communication with the first accommodating space 110B is provided in the second frame body 31B. One-ends of the multiple conductive pins 33B are provided in the second insulation piece 32B and are exposed out of a surface of the second insulation piece 32B. The-other-ends of the multiple conductive pins 33B are electrically connected to one surface, back to the conductive contacts 13, of the circuit board 14B to implement electrical connection to the conductive contacts 13A. In this embodiment, the-other-ends of the multiple conductive pins 33B are welded on the circuit board 14B; one end of the second frame body 31B is an opening; the surface, on which the multiple conductive pins 33B are exposed, of the second insulation piece 32B is exposed out of the second frame body 31B by means of the foregoing opening, so that when a plug-connected end 30B is inserted into the lightning interface of the electronic apparatus 200, the interface conversion adapter 100 is electrically connected to the lightning interface of the electronic apparatus 200. The second insulation piece 32B is configured to insulate the multiple conductive pins 33B, and is configured to insulate the multiple conductive pins 33B from the second frame body 31B.

It can be understood that in other embodiments, the one-ends, provided in the second insulation piece 32B, of the multiple conductive pins 33B can be exposed on two opposite surfaces of the second insulation piece 32B; two ends of the second frame body 31B are both set to be open-shaped, so that the multiple conductive pins 33B are exposed on two opposite surfaces of the second frame body 31B. In this way, the plug-connected end 30B can be arbitrarily inserted into the lightning interface of the electronic apparatus 200 without distinguishing a front side from a reverse side, so as to implement electrical connection to the lightning interface in the electronic apparatus 200.

In this specific embodiment, the used solution is implemented in a manner of the interface conversion adapter 100. The interface conversion adapter 100 converts a plug-in interface (a lightning interface on a mobile phone) of an existing mobile device (that is, the mobile phone) into surface conductive contacts. The first frame body 11B in the interface conversion adapter 100 in a periphery of the conductive contacts 13B is formed by iron-containing steel. An external connector (not shown) implements connection to the interface of the mobile device by means of magnetic attraction to the interface conversion adapter 100. The first frame body 11B and the second frame body 31B of the interface conversion adapter 100 are processed and manufactured by using integrally formed iron-containing steel. A part exposed out of the lightning interface after the interface conversion adapter 100 is inserted into the lightning interface is thin, and a material of the iron-containing steel ensures strength of the interface conversion adapter 100. The first insulation piece 12B is a porous plastic sheet; the multiple conductive contacts 13B are metal conductive contacts; the circuit board 14B is a flexible circuit board; the second insulation piece 32B is a plastic filler; and the plug-in interface of the mobile device is a lightning interface of an iPhone or an iPad.

Figure 6:
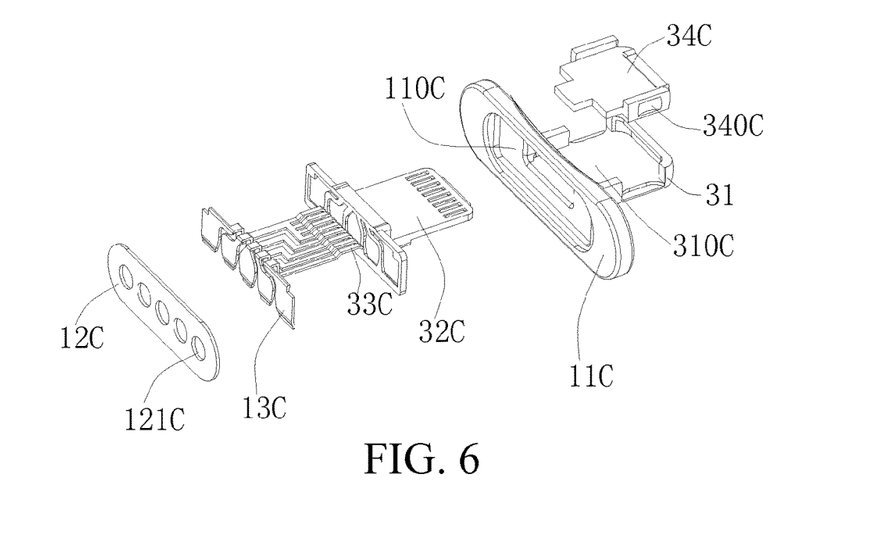
FIG. 6 is an exploded view of an interface conversion adapter in a third embodiment.

Referring to FIG. 6, in a third embodiment, the interface conversion adapter 100 is configured to be plug-connected in a lightning interface of an electronic apparatus, for example, an iPhone or an iPad.

The contact end 10 includes a first frame body 11C, a first insulation piece 12C, and multiple conductive contacts 13C. The plug-connected end 30 includes a second frame body 31C, a second insulation piece 32C, multiple conductive pins 33C, and a third insulation piece 34C.

When the interface conversion adapter 100 is inserted into the lightning interface of the electronic apparatus 200, the first frame body 11C is exposed out of the lightning interface of the electronic apparatus 200 and is attracted to the external device, so as to fix the electronic apparatus 200 to the external device; the second frame body 31C is plug-connected in the lightning interface of the electronic apparatus 200 and is connected to a ground end in the electronic apparatus 200. In this embodiment, the first frame body 11C and the second frame body 31C are ferromagnetic metal conductive frames that are integrally formed and T-shaped, so that attraction to the external device and connection to the ground end in the connector interface of the electronic apparatus 200 are implemented at the same time after the interface conversion adapter 100 is inserted into the electronic apparatus 200. The first frame body 11C is a lateral extended edge, and the second frame body 31C is a vertical extended edge perpendicular to the first frame body 11C. In addition, after the interface conversion adapter 100 is inserted into the lightning interface of the electronic apparatus 200, a part exposed out of the lightning interface is thin, so that the first frame body 11C that includes a metal material can effectively ensure strength of the interface conversion adapter 100.

It can be understood that in some other embodiments, the first frame body 11C and the second frame body 31C can be independently set, and they are fixedly connected in other manners (for example, welding or screws). In addition, shapes of the first frame body 11C and the second frame body 31C can also be determined according to a shape of the lightning interface in the electronic apparatus 200, and materials can also be determined according to requirements, and limitation is not made herein.

A first accommodating space 110C that passes through a surface is provided in the middle of the first frame body 11C. In addition, one side of the first frame body 11C is recessed inwards to form a particular arc, so that the interface conversion adapter 100 can be extracted by a user with applied force after being assembled on the lightning interface of the electronic apparatus 200. In this embodiment, the first insulation piece 12C is a plastic plate provided on the first frame body 11C, and is configured to mount the conductive contacts 13C and insulate the conductive contacts 13C from the first frame body 11C. Specifically, the first insulation piece 12C is accommodated in the first accommodating space 110C, and multiple through holes 121C are provided on a surface of the first insulation piece 12C along an extension direction of the first frame body 11C. In some other embodiments, the first insulation piece 12C and the first frame body 11C can be set as an entirety, and limitation is not made herein.

A second accommodating space 310C in communication with the first accommodating space 110C is provided in the second frame body 31C. The third insulation piece 34C is accommodated in the second accommodating space 310C to insulate detection pins (not shown) in the lightning interface of the electronic apparatus 200 from a metal buckle (not shown), so as to prevent mutual conduction therebetween. At the same time, a clamping slot 340C matching the metal buckle is provided on two sides, perpendicular to the first frame body 11C, of the third insulation piece 34C.

In this embodiment, the conductive contacts 13C and the conductive pins 33C are integrally formed into a conductive body, and are accordingly accommodated in the first accommodating space 110C and the second accommodating space 310C by means of the second insulation piece 32C, so as to implement electrical connection between the contact end 10 and the plug-connected end 30. Specifically, the second insulation piece 32C is a T shape corresponding to the first frame body 11C and the second frame body 31C, so as to insulate the conductive body integrally formed by the conductive contacts 13C and the conductive pins 33C from the first frame body 11C and the second frame body 31C.

The multiple conductive contacts 13C pass through the multiple through holes 121C in a one-to-one correspondence manner, are exposed out of the first insulation piece 12C, and get in conductive contact with the external device attracted on the interface conversion adapter 100, so as to implement electrical connection between the interface conversion adapter 100 and the external device, thereby implementing electrical connection between the electronic apparatus 200 and the external device. In this embodiment, the conductive contacts 13C are five metal conductive contacts.

One-ends of the multiple conductive pins 33C are exposed out of a surface of the second insulation piece 32C. One end of the second frame body 31C is an opening; the surface, on which the multiple conductive pins 33C are exposed, of the second insulation piece 32C is exposed out of the second frame body 31C by means of the foregoing opening, so that when a plug-connected end 30C is inserted into the lightning interface of the electronic apparatus 200, the interface conversion adapter 100 is electrically connected to the lightning interface of the electronic apparatus 200. The second insulation piece 32C is configured to insulate the multiple conductive pins 33C, and is configured to insulate the multiple conductive pins 33C from the second frame body 31C.

It can be understood that in other embodiments, the one-ends, provided in the second insulation piece 32C, of the multiple conductive pins 33C can be exposed on two opposite surfaces of the second insulation piece 32C; two ends of the second frame body 31C are both set to be open-shaped, so that the multiple conductive pins 33C are exposed on two opposite surfaces of the second frame body 31C. In this way, the plug-connected end 30C can be arbitrarily inserted into the lightning interface of the electronic apparatus 200 without distinguishing a front side from a reverse side, so as to implement electrical connection to the lightning interface in the electronic apparatus 200.

Referring to FIG. 7 and FIG. 9 to FIG. 12, the interface conversion adapter 100 can form an electrical connection device along with a base 500 formed by one or a combination of multiple of a charging cradle with a charging function, a mobile power supply, and a cable connector with charging and data transmission functions. The electrical connection device is connected to an external power supply. The interface conversion adapter 100 is plug-connected in the plug-in interface of the electronic apparatus 200. The base 500 is electrically connected to the interface conversion adapter 10 in a surface contact electrical connection manner to finally implement charging and/or data transmission on the electronic apparatus 200 by the base 500.

Figure 8:
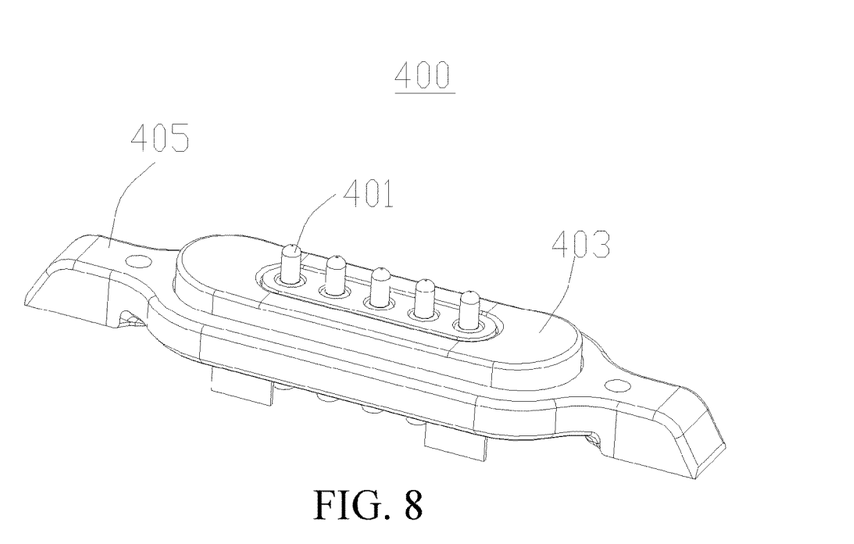
FIG. 8 is a schematic structural diagram of a contactor in an embodiment.
Figure 9:
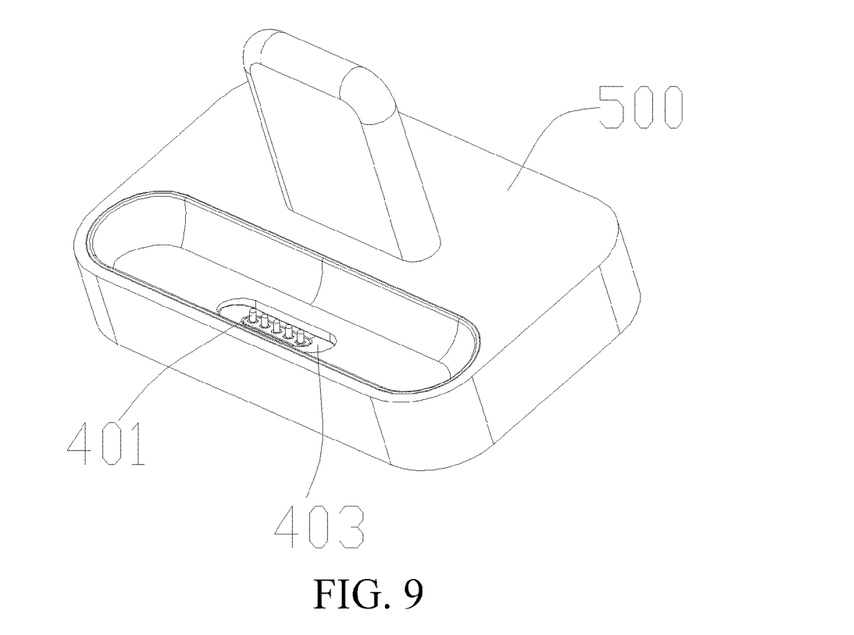
FIG. 9 is a diagram of a match between the contactor shown in FIG. 8 and a base.

Referring to FIG. 8 and FIG. 9, a contactor 400 includes a magnetic metal housing 405, multiple spring needles 401, and magnetic pieces 403. The multiple spring needles 401 are inserted in the magnetic metal housing 405 and are elastically provided on the base 500, and can pop up and retract downwards relative to the base 500 under an effect of an external force, so as to be separately connected and disconnected to a power supply in the base 500. Specifically, in this embodiment, the multiple spring needles 401 are arranged on one side, matching the plug-in interface of the electronic apparatus 200, of the base 500 in a straight line in a one-to-one correspondence to the multiple conductive contacts 13A, 13B, and 13C.

In one of embodiments therein, the magnetic pieces 403 can be provided on the contactor 400 or the interface conversion adapter 100, so as to be attracted to the corresponding ferromagnetic metal frames (11A, 11B, and 11C) or the magnetic metal housing 405, so as to fix the electronic apparatus 200 to the base 500.

In this embodiment, the magnetic pieces 403 are magnets provided on opposite two sides of the row of spring needles 401, and fixation between the electronic apparatus 200 and the base 500 is implemented by means of magnetic attraction to the first frame bodies 11A, 11B, and 11C, that is, the ferromagnetic metal frames. Magnetic poles of the two magnetic pieces 403 are set in opposite directions, that is, a magnetic pole, facing the interface conversion adapter 100, of one of the two magnetic pieces 403 is an N pole, and a magnetic pole, facing the interface conversion adapter 100, of the other one of the two magnetic pieces 403 is an S pole. In this way, the two magnetic pieces 403 form a magnetic cycle, so as to strengthen a magnetic attraction force between the contactor 400 and the interface conversion adapter 100.

It can be understood that in some other embodiments, the magnetic pieces 403 may also be provided on the base 500 or on the electronic apparatus 200, and limitation is not made herein, and it is only required to fix the electronic apparatus 200 to the base 500 in an attraction manner.

In use, the plug-connected end 30 is inserted into the plug-in interface of the electronic apparatus 200; the contact end 10 is exposed out of the plug-in interface and has a surface contact electrical connection to the spring needles 401 of the contactor 400 in a one-to-one correspondence manner, so as to implement an electrical connection between the contactor 400 and the plug-in interface, thereby implementing an electrical connection between the base 500 and the electronic apparatus 200 to perform charging and/or data transmission on the electronic apparatus 200. In this way, a plug-in electrical connection manner between the plug-in interface and an external connector is converted into surface contact electrical connection, so as to avoid repeated insertion and extraction operations on the plug-in interface, and simply an operation process.

Detailed description is made below by separately using electrical connection devices formed by the interface conversion adapter 100 and various bases 500 as examples. For briefness, the multiple conductive contacts 13A, 13B, and 13C are collectively called multiple conductive contacts 13 below, and the first frame bodies 11A, 11B, and 11C are collectively called first frame body 11 below.

Figure 7:
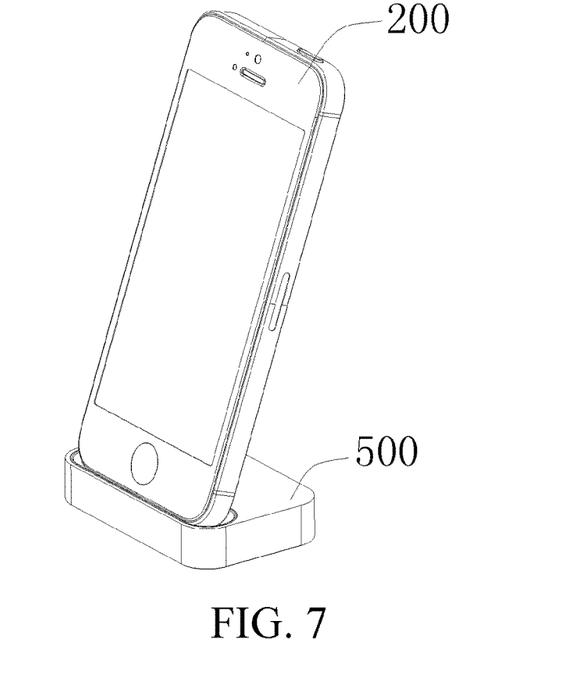
FIG. 7 is a diagram of state in which an electrical connection device matches an electronic apparatus in a fourth embodiment.

Continuing to refer to FIG. 7, in a fourth embodiment, a base 500 is a charging cradle that charges the electronic apparatus 200; the charging cradle may carry a power supply of itself inside, and may also be connected to an external power supply via a power cable, and limitation is not made herein. A contactor 400 is provided on the charging cradle (that is, the base 500). The interface conversion adapter 100 is plug-connected in the plug-in interface of the electronic apparatus 200 (that is, the mobile phone).

In use, the charging cradle is connected to the external power supply; one end, plug-connected to the interface conversion adapter 100, of the electronic apparatus 200 is aligned to the contactor 400 on the charging cradle; the electronic apparatus 200 is attracted on the charging cradle under an effect of a magnetic force of magnetic pieces 403; spring needles 401 get in contact with conductive contacts 13 in a one-to-one correspondence manner and implement electrical connection. In this case, the two magnetic pieces 403 are attracted on two ends of a first frame body 11 in the interface conversion adapter 100; the spring needles 401 press down under an effect of pressure of the electronic apparatus 200 and are connected to the power supply in the charging cradle, so that the charging cradle charges the electronic apparatus 200; after charging is completed, the electronic apparatus 200 is taken down from the charging cradle; the spring needles 401 pop up relative to the charging cradle and are disconnected from the power supply in the charging cradle to prevent short-circuit.

Figure 10:
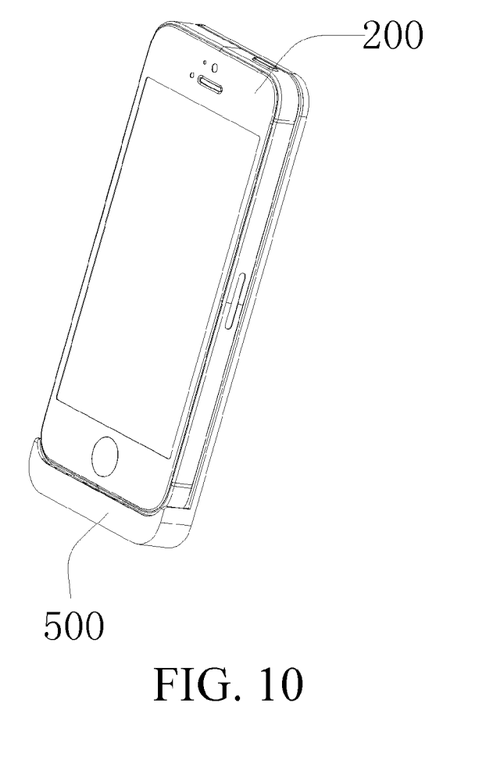
FIG. 10 is a diagram of state in which an electrical connection device matches an electronic apparatus in a fifth embodiment.

Referring to FIG. 10, in a fifth embodiment, a base 500 is a mobile power supply that charges the electronic apparatus 200. The mobile power supply is approximately L-shaped, and forms an accommodating groove 501 for accommodating the electronic apparatus 200. A contactor 400 is provided on a groove wall on one side of the accommodating groove 501. The interface conversion adapter 100 is plug-connected in the plug-in interface of the electronic apparatus 200 (that is, the mobile phone).

In use, one end, plug-connected to the interface conversion adapter 100, of the electronic apparatus 200 is aligned to the contactor 400 on the accommodating groove 501; the electronic apparatus 200 is attracted on the mobile power supply under an effect of a magnetic force of magnetic pieces 403; spring needles 401 get in contact with conductive contacts 13 in a one-to-one correspondence manner and implement electrical connection. In this case, the two magnetic pieces 403 are attracted on two ends of a first frame body 11 in the interface conversion adapter 100; the spring needles 401 press down under an effect of pressure of the electronic apparatus 200 and are connected to a power supply in the mobile power supply, so that the mobile power supply charges the electronic apparatus 200; after charging is completed, the electronic apparatus 200 is taken down from the mobile power supply; the spring needles 401 pop up relative to the mobile power supply and are disconnected from the power supply in a charging mobile power supply cradle to prevent short-circuit. In this process, the electronic apparatus 200 can form an entirety with the mobile power supply when the electronic apparatus 200 is attracted on the mobile power supply by means of a magnetic force. In this way, a user can hold such an entirety, so as to continue to use the electronic apparatus 200 conveniently during charging.

Figure 11:
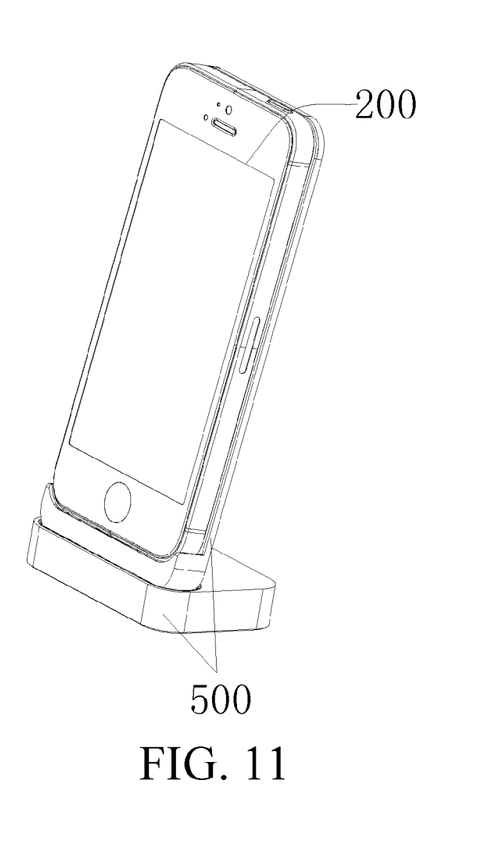
FIG. 11 is a diagram of state in which an electrical connection device matches an electronic apparatus in a sixth embodiment.

Referring to FIG. 11, in a sixth embodiment, a base 500 is a mobile power supply and a charging cradle that charge the electronic apparatus 200. The mobile power supply is placed on the charging cradle. The electronic apparatus 200 is accommodated in the mobile power supply. One end, opposite to the charging cradle, of the mobile power supply is provided with contacts (not shown). A contactor 400 that implements an electrical connection to the contacts of the mobile power supply is provided on the charging cradle. One end, opposite to the electronic apparatus 200, of the mobile power supply is provided with the contactor 400. The interface conversion adapter 100 is plug-connected in the plug-in interface of the electronic apparatus 200, and implements an electrical connection to the contactor 400 on the mobile power supply. In this way, the mobile power supply may be charged by means of the charging cradle, so as to charge the electronic apparatus 200.

Figure 12:
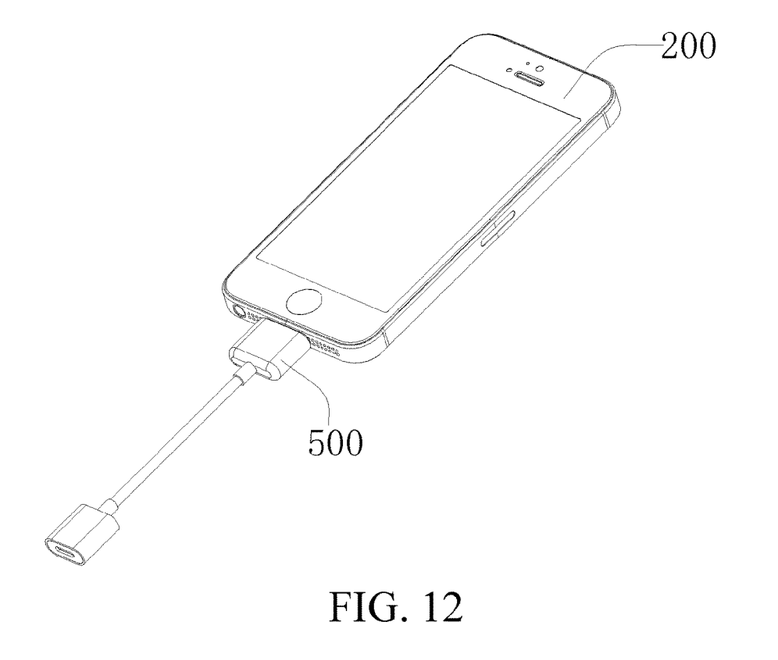
FIG. 12 is a diagram of state in which an electrical connection device matches an electronic apparatus in a seventh embodiment.
Figure 13:
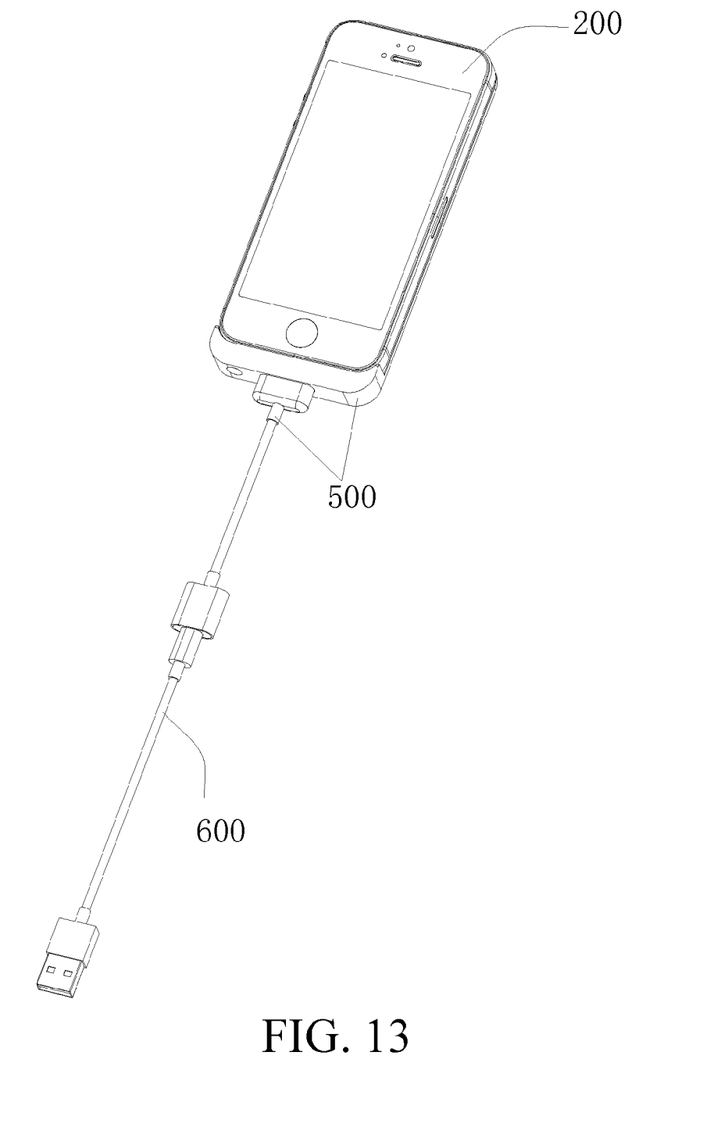
FIG. 13 is a diagram of state in which an electrical connection device matches an electronic apparatus in an eighth embodiment.

Referring to FIG. 12 and FIG. 13, in a seventh embodiment, a base 500 is a cable connector that performs charging and data transmission on the electronic apparatus 200. One end of the cable connector is provided with a contactor 400, and the other end of the cable connector is provided with an interface connected to a data line 600. The interface conversion adapter 100 is plug-connected in the plug-in interface of the electronic apparatus 200 (that is, the mobile phone).

In use, one end, plug-connected to the interface conversion adapter 100, of the electronic apparatus 200 is aligned to the contactor 400 of the cable connector; the electronic apparatus 200 is connected to a cable under an effect of a magnetic force of magnetic pieces 403; spring needles 401 get in contact with conductive contacts 13 in a one-to-one correspondence manner and implement electrical connection; the data line 600 is plug-connected to the other end of the cable connector, so that the data line 600 is electrically connected to the plug-in interface of the electronic apparatus 200 by means of the cable connector, so as to implement charging and data connection on the electronic apparatus 200. Because the conductive contacts 13 on the interface conversion adapter 100 are symmetrically shaped, the cable connector can be arbitrarily attracted on the interface conversion adapter 100 without distinguishing a front side from a reverse side, so as to perform charging and data transmission.

Referring to FIG. 2, in an eighth embodiment, a base 500 is a mobile power supply that charges the electronic apparatus 200 and a cable connector that performs charging and data transmission on the electronic apparatus 200. The interface conversion adapter 100 is plug-connected in the plug-in interface of the electronic apparatus 200. The electronic apparatus 200 is accommodated in the mobile power supply, and one end, opposite to the electronic apparatus 200, of the mobile power supply is provided with a contactor 400 electrically connected to the interface conversion adapter 100. One end, opposite to the cable connector, of the mobile power supply is provided with contacts (not shown). One end of the cable connector is provided with the contactor 400 electrically connected to the contacts on the mobile power supply, and the other end of the cable connector is provided with an interface connected to a data line 600. In this way, the mobile power supply can perform charging and data transmission on the electronic apparatus 200 by means of the data line 600.

In the present invention, a plug-in interface of an electronic apparatus 200 can be converted into surface contact conductive contacts by using the interface conversion adapter 100. In this way, when charging and/or data transmission are performed on the electronic apparatus 200 by means of a base 500 (including one or a combination of multiple of the aforementioned charging cradle, mobile power supply, or cable connector), a magnetic attraction connection may be used. A charging process of the electronic apparatus 200 is simplified into only one step to implement a contact wireless charging manner without repeated insertion and extraction, having strong practicability, and being easy and convenient.

The foregoing embodiments merely express several implementation manners of the present invention, and are described in detail, but cannot be understood as limitation to the patent scope of the present invention. It should be pointed out that, for a person of ordinary skill in the art, under a precondition of not departing from the conception of the present invention, several transformations and improvement can further be made, and belong to the protection scope of the present invention. Therefore, the protection scope of the present patent for invention is subject to the appended claims.

What is claimed is:

1. An interface conversion adapter, configured to be inserted into a plug-in interface of an electronic apparatus to convert a plug-in electrical connection manner of the plug-in interface into a surface contact electrical connection manner, characterized in that, the interface conversion adapter comprises a contact end and a plug-connected end electrically connected to the contact end; the plug-connected end is electrically inserted into the plug-in interface of the electronic apparatus; the contact end is exposed out of the plug-in interface; multiple conductive contacts are provided on a surface, exposed out of the plug-in interface, of the contact end; the contact end comprises a first frame body and a first insulation piece; the plug-connected end comprises a second frame body, a second insulation piece, and multiple conductive pins; the first insulation piece is provided on the first frame body and multiple through holes are provided on a surface of the first insulation piece; the multiple conductive contacts pass through the through holes in a one-to-one correspondence manner and are exposed out of the first insulation piece; the multiple conductive pins are electrically connected to the multiple conductive contacts and are accommodated in the second frame body by means of the second insulation piece; and the first frame body and the second frame body are ferromagnetic metal conductive frames that are integrally formed together and T-shaped.

2. The interface conversion adapter according to claim 1, characterized in that, the contact end further comprises a circuit board, wherein the multiple conductive contacts are separately electrically connected to the multiple conductive pins on two surfaces, back to each other, of the circuit board.

3. The interface conversion adapter according to claim 2, characterized in that, one side of the first frame body is recessed inwards to form a particular arc.

4. An electrical connection device, characterized in that, the electrical connection device is configured to be electrically connected to an electronic apparatus to implement charging and/or data transmission on the electronic apparatus, wherein the electrical connection device comprises a connector pair and a base electrically connected to one connector of the connector pair; the connector pair comprises an interface conversion adapter and a contactor electrically connected to the interface conversion adapter; the interface conversion adapter is the interface conversion adapter according to claim 2; the contactor comprises a magnetic metal housing and multiple spring needles; the multiple spring needles are inserted in the magnetic metal housing and are elastically provided on the base to be electrically connected to multiple conductive contacts in the interface conversion adapter; magnetic pieces configured to fix the base and the electronic apparatus are provided on the contactor or the interface conversion adapter.

5. The interface conversion adapter according to claim 1, characterized in that, the conductive contacts are integrally formed with the conductive pins; the integrally formed conductive contacts and conductive pins are mounted in the second insulation piece and are accommodated in the first frame body and the second frame body by means of the second insulation piece; and the conductive contacts pass through the through holes and are exposed out of the second insulation piece in a one-to-one correspondence manner.

6. The interface conversion adapter according to claim 5, characterized in that, one side of the first frame body is recessed inwards to form a particular arc.

7. An electrical connection device, characterized in that, the electrical connection device is configured to be electrically connected to an electronic apparatus to implement charging and/or data transmission on the electronic apparatus, wherein the electrical connection device comprises a connector pair and a base electrically connected to one connector of the connector pair; the connector pair comprises an interface conversion adapter and a contactor electrically connected to the interface conversion adapter; the interface conversion adapter is the interface conversion adapter according to claim 5; the contactor comprises a magnetic metal housing and multiple spring needles; the multiple spring needles are inserted in the magnetic metal housing and are elastically provided on the base to be electrically connected to multiple conductive contacts in the interface conversion adapter; magnetic pieces configured to fix the base and the electronic apparatus are provided on the contactor or the interface conversion adapter.

8. The interface conversion adapter according to claim 1, characterized in that, one side of the first frame body is recessed inwards to form a particular arc.

9. An electrical connection device, characterized in that, the electrical connection device is configured to be electrically connected to an electronic apparatus to implement charging and/or data transmission on the electronic apparatus, wherein the electrical connection device comprises a connector pair and a base electrically connected to one connector of the connector pair; the connector pair comprises an interface conversion adapter and a contactor electrically connected to the interface conversion adapter; the interface conversion adapter is the interface conversion adapter according to claim 8; the contactor comprises a magnetic metal housing and multiple spring needles; the multiple spring needles are inserted in the magnetic metal housing and are elastically provided on the base to be electrically connected to multiple conductive contacts in the interface conversion adapter; magnetic pieces configured to fix the base and the electronic apparatus are provided on the contactor or the interface conversion adapter.

10. The interface conversion adapter according to claim 1, characterized in that, the plug-connected end is compatible with a Micro-USB interface, a USB 3.1 Type-C interface, or a lightning interface.

11. An electrical connection device, characterized in that, the electrical connection device is configured to be electrically connected to an electronic apparatus to implement charging and/or data transmission on the electronic apparatus, wherein the electrical connection device comprises a connector pair and a base electrically connected to one connector of the connector pair; the connector pair comprises an interface conversion adapter and a contactor electrically connected to the interface conversion adapter; the interface conversion adapter is the interface conversion adapter according to claim 1; the contactor comprises a magnetic metal housing and multiple spring needles; the multiple spring needles are inserted in the magnetic metal housing and are elastically provided on the base to be electrically connected to multiple conductive contacts in the interface conversion adapter; magnetic pieces configured to fix the base and the electronic apparatus are provided on the contactor or the interface conversion adapter.

12. The electrical connection device according to claim 11, characterized in that, the base is one or more of a charging cradle, a mobile power supply, or a cable connector.

13. The electrical connection device according to claim 12, characterized in that, the base is a cable connector, wherein one end of the cable connector is provided with a contactor, and the other end of the cable connector is connected to a data line.

14. The electrical connection device according to claim 11, characterized in that, the multiple spring needles are arranged on one side, matching a plug-in interface of the electronic apparatus, of the base in a straight line in a one-to-one correspondence manner to the multiple conductive contacts; the magnetic pieces are magnets provided on opposite two sides of the row of spring needles, and magnetic poles of the magnetic pieces are provided in opposite directions.

* * * * *